UNITED STATES PATENT OFFICE.

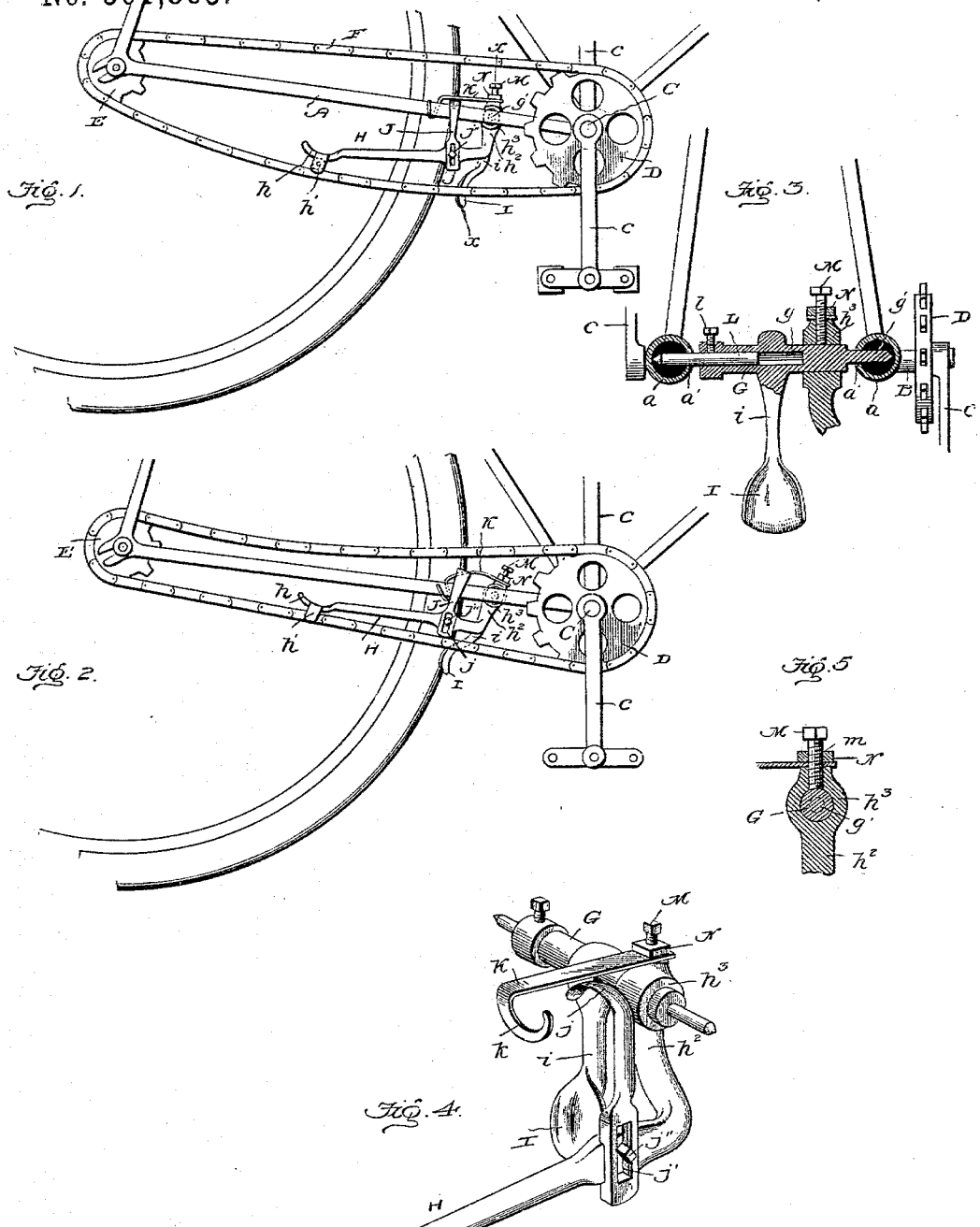

LEWIS H. GUERTIN, OF MOMENCE, ILLINOIS.

AUTOMATIC BICYCLE-BRAKE.

SPECIFICATION forming part of Letters Patent No. 561,885, dated June 9, 1896.

Application filed November 4, 1895. Serial No. 567,906. (No model.)

*To all whom it may concern:*

Be it known that I, LEWIS H. GUERTIN, a citizen of the United States, residing at Momence, in the county of Kankakee and State of Illinois, have invented certain new and useful Improvements in Automatic Bicycle-Brakes; and I do hereby declare the following to be a full, clear, and exact description of the invention, such as will enable others skilled in the art to which it appertains to make and use the same.

My invention relates to improvements in brakes designed for use on cycle-vehicles, and more especially to safety-bicycles; and the object of the invention is to provide a simple and easily-applied brake which will be automatically operated when back pressure is exerted on the propelling-pedals of the machine.

A further object of the invention is to provide means which will tend to positively throw the brake-shoe away from the wheel-tire when the rider ceases to back-pedal; and a further object of the improvement is to provide means to adjust the lever-arm relatively to the slack side of the sprocket-chain, so that the position of the said lever-arm can be regulated according to the extent of the slack in the chain.

With these ends in view my invention consists in the novel combination of devices and in the construction and arrangement of parts, which will be hereinafter fully described and claimed.

To enable others to understand my improvements, I have illustrated the same in the accompanying drawings, forming a part of this specification, and in which—

Figure 1 is a side elevation of a part of a bicycle with my improved brake applied thereto. Fig. 2 is a similar view showing the position of the brake when applied against the wheel-tire. Fig. 3 is a vertical cross-sectional view on the plane indicated by the dotted line $x\,x$ of Fig. 1. Fig. 4 is a detail perspective view of the automatic brake detached from the bicycle-frame. Fig. 5 is a detail sectional view through a part of the brake.

Like letters of reference denote corresponding parts in all the figures of the drawings.

The propelling mechanism ordinarily used on cycle-vehicles consists of a crank-shaft carrying a driving sprocket-wheel and pedal-cranks, another sprocket-wheel rigid with the rear hub of the driving carrying-wheel, and an endless chain passing around the two sprocket-wheels and serving to transmit motion from the sprocket-wheel on the crank-shaft to the sprocket-wheel on the rear hub. It is well known that when the rider applies power to the pedal-cranks to propel the machine forward the upper side of the sprocket-chain is taut and transmits the motion from one wheel to the other, while the lower side of the sprocket-chain is slack or loose. A great many riders prefer to dispense with a hand-operated brake and to arrest the forward motion of the machine whenever occasion requires by "back-pedaling," or, in other words, applying pressure on the pedals in a reverse direction to resist the forward motion of the pedals and driving mechanism. When back pressure is applied to the pedals for the purpose of arresting the forward movement of the vehicle, the condition of the sprocket-chain is changed, so that the upper side becomes slack and the lower side is taut; and I take advantage of this changed condition of the sprocket-chain to operate my brake automatically.

In the drawings, A designates the forked lower part of a bicycle-frame having the bearing B. C is the crank-shaft, which is journaled in the bearing B, and which carries the pedal-cranks $c$. D is the driving sprocket-wheel on the crank-shaft C. E is the sprocket rigid with the hub of the rear wheel, and F is the endless sprocket-chain which connects the sprocket-wheels D E. All of these parts are of any common construction.

My improved brake consists of a shaft G, a lever H, a shoe I, an upright adjustable stop J, and a spring K, the detailed construction of which parts will now be described.

The shaft G is preferably made tubular for a part of its length to provide a socket $g$ in one end thereof to receive one end of a pivot-pin L. This pin L is adjustable longitudinally in the socket $g$, and it is held at any desired point of adjustment thereon by means of a set-screw $l$, which works in a threaded bearing in the shaft G, and binds upon the pin L. At the opposite end of the shaft from the adjustable pin L a pivot-pin $g'$ is provided, which is rigid or integral with the shaft, and the rigid and adjustable pivot-pins $g'$ L are pointed at their outer ends to enable them to rock or turn freely in the tubular bars $a$ of the fork A. These tubular bars $a$ are bored with holes $a'$ $a'$ in their opposing faces or walls, (see Fig. 3,) and through these holes $a'$ $a'$ are passed the pivot-pins L $g'$ of the rock-shaft, the pointed ends of the pins impinging against the outer walls of the tubular bars $a$, so as to arrest the endwise movement of the rock-shaft.

It will be seen that the rock-shaft G is arranged in a horizontal position to span or bridge the space between the tubular side bars $a$ of the frame-fork A, in rear of the bearing B and in front of the rear wheel.

By providing the shaft with the adjustable pin L it can be easily retracted to enable the shaft to be readily placed between the frame-bars $a$, and said pin can be adjusted to compensate for differences in the width of the frame-bars $a$ and for differences between the bars $a$ $a$, to render the brake applicable to different styles of cycle-vehicles.

The lever H is provided at one end with a shoe $h$, which is formed by a broad concavo-convex face which is adapted, when the lower side of the chain is drawn taut by back-pedaling, to ride upon the chain, and from this shoe $h$ depends the flanges $h'$ $h'$, which are spaced apart to embrace the sides of the chain and to keep the chain and lever H in proper position for the lever-shoe $h$ to bear against the chain. The opposite or forward end of the lever H is bent laterally, or inward, and then upward, to provide the angular arm $h^2$, which terminates in a collar $h^3$. This collar $h^3$ of the lever is slipped over the tubular shaft G, at or near the end which carries the fast pin $g'$, and in said collar $h^3$ is formed a threaded opening $m$, in which works the long threaded shank of a clamping-screw M, that binds upon the shaft G, and thus serves to rigidly clamp the lever H to the rock-shaft.

The brake-shoe I is shaped to fit or bear against the periphery of the wheel-tire, and said shoe is integral with a shank $i$, which is fast with the shaft G by being rigidly united to or made integral with said shaft.

As the rock-shaft G is journaled between the bars $a$ $a$ of the fork A, I make the angular arm $h^2$ on the lever H for the purpose of bringing the lever H below one of the fork-bars $a$, so that the lever occupies a position between the upper and lower sides of the endless sprocket-chain and the shoe $h$ is adapted to take a position immediately over the lower side of said chain.

The stop J is in the form of an upright bar applied against the outer face or side of the lever H, so as to rise therefrom and engage with one of the bars $a$ of the frame-fork. The upper end of the stop-bar is curved or bent to form the hook $j$, which projects inwardly over the bar $a$ of the frame-fork A, so as to limit or arrest the downward movement of the lever H to which the stop-bar is attached. This stop-bar has a longitudinal slot $j$ near its lower end, through which slot passes the threaded shank of a headed clamping-screw $j'$. This screw works in a threaded aperture in the lever H and the head of the screw binds against the stop-bar to rigidly hold it in an upright position on the lever, but by loosening the screw the stop-bar can be raised or lowered, as required.

It is well known that the slack in the endless sprocket-chain increases until it reaches a point where it is necessary to tighten up the chain to secure the best results. In order to make the brake operate to the best advantage, the stop-bar is adjusted to hold or suspend the brake-lever in a position where it is free from the slack side of the chain when the machine is propelled in a forward direction, thus reducing the wear and friction on the parts to a minimum and preventing rattling of the parts; but when the rider applies power in a backward direction to resist the forward motion of the machine the lower side of the sprocket-chain becomes taut and presses up against the shoe $h$ on the lever H, which turns the rock-shaft G, and thereby presses the brake-shoe I firmly against the tire so as to resist the forward motion of the bicycle.

To return the parts quickly to their normal positions when back-pedaling ceases and prevent "sticking" of any of the parts, I provide the spring K, which is thrown into action when the brake-lever is raised and which remains inactive so long as the brake-lever is suspended by the adjustable stop-bar free from engagement with the sprocket-chain. The preferred construction of the spring is shown in the accompanying drawings as consisting of a leaf-spring having a right-angled or offstanding hook $k$, adapted to fit beneath the bar $a$ of the frame-fork, and the other end of this leaf-spring has an eye or perforation which is slipped over the threaded shank of the clamping-screw M, so that the end of the spring bears down upon a flat top surface on the collar $h^3$ of the lever H, said spring being held securely in place by means of a nut N, which is screwed on the threaded shank of the screw M, so as to bear down upon the end of the spring K and confine it between the collar $h^3$ and the nut N.

The retracting-spring is carried by and movable with the rock-shaft, and it is so arranged that when the lever H is free from the chain and the brake-shoe I is free from the wheel-tire the offstanding end $k$ of the spring rests idly below the bar $a$ of the frame-fork A; but when the brake-lever is raised by the lower side of the chain becoming taut, so as to rock the shaft G and apply the brake-lever, the end $k$ of the spring presses against the bar $a$, and when the lower side of the chain again becomes slack the spring quickly returns the brake to its normal position assisted by the weight of the lever H.

It is thought that the operation and advantages of my invention will be readily understood from the foregoing description taken in connection with the drawings.

Having thus fully described my invention, what I claim as new, and desire to secure by Letters Patent, is—

1. An automatic brake for cycle-vehicles consisting of a rock-shaft carrying a shoe, a lever, and a stop-bar J attached to the lever and adjustable vertically thereon, substantially as and for the purposes described.

2. In an automatic bicycle-brake substantially such as herein described the combination with a rock-shaft, a brake-shoe carried by said rock-shaft, and a brake-lever, of the leaf-spring K rigidly fastened at one end to said rock-shaft to turn therewith and provided at its free end with an offstanding arm or hook adapted to take against a part of the bicycle-framing, said spring being arranged to exert its force on the rock-shaft only when the brake is applied, substantially as and for the purposes described.

3. An automatic brake for cycle-vehicles comprising a rock-shaft carrying a shoe, a brake-lever provided with an angular arm which terminates in a collar that slips on the rock-shaft, a leaf-spring fitted on said collar and having an offstanding free end, and a clamping-screw which confines the collar and spring rigidly on the rock-shaft, substantially as described.

4. The combination with the tubular fork-bars $a$ having the openings $a'$ in their inner walls, of the rock-shaft provided with the pivot-pins, one of which is adjustable, which pins pass through the openings $a'$ and abut against the outer walls of said tubular bars $a$, a brake-shoe, a lever rigid with the rock-shaft, an adjustable stop-bar carried by the lever and engaging with one of the bars $a$, and a spring rigid with the rock-shaft and also engaging one of the bars $a$, substantially as described.

In testimony whereof I affix my signature in presence of two witnesses.

LEWIS H. GUERTIN.

Witnesses:
A. S. BURTT,
C. A. SMYTH.